(12) United States Patent  (10) Patent No.: US 8,235,723 B2
Macalister  (45) Date of Patent: Aug. 7, 2012

(54) FLIGHT SIMULATOR YOKE

(76) Inventor: Doug Macalister, Glendale, AZ (US)

( * ) Notice: Subject to any disclaimer, the term of this patent is extended or adjusted under 35 U.S.C. 154(b) by 946 days.

(21) Appl. No.: 12/263,242

(22) Filed: Oct. 31, 2008

(65) Prior Publication Data

US 2009/0208911 A1  Aug. 20, 2009

Related U.S. Application Data

(60) Provisional application No. 61/028,674, filed on Feb. 14, 2008.

(51) Int. Cl.
 *G09B 9/08* (2006.01)
(52) U.S. Cl. ............................................ 434/45; 434/30
(58) Field of Classification Search .................... 434/29, 434/30, 35, 45; 463/37, 38; 446/7
See application file for complete search history.

(56) References Cited

U.S. PATENT DOCUMENTS

| | | | |
|---|---|---|---|
| 3,007,258 A | 11/1961 | Hemstreet et al. | |
| 3,303,714 A | 2/1967 | Fontaine | |
| 3,303,715 A | 2/1967 | Zimer | |
| 3,805,413 A | 4/1974 | Burny et al. | |
| 4,024,651 A * | 5/1977 | Lantrip | 434/45 |
| 4,422,851 A | 12/1983 | Hayashigawa et al. | |
| 4,568,286 A | 2/1986 | Acklam | |
| 4,659,313 A * | 4/1987 | Kuster et al. | 434/45 |
| 4,713,007 A * | 12/1987 | Alban | 463/37 |
| 4,820,162 A | 4/1989 | Ross | |
| 4,861,269 A | 8/1989 | Meenen, Jr. | |
| 4,907,970 A | 3/1990 | Meenen, Jr. | |
| 5,125,602 A | 6/1992 | Vauvelle | |
| 5,286,024 A * | 2/1994 | Winblad | 273/148 B |
| 5,436,640 A * | 7/1995 | Reeves | 345/161 |
| 5,470,232 A * | 11/1995 | Kelso et al. | 434/45 |
| 5,522,568 A | 6/1996 | Kamen et al. | |
| 5,630,756 A * | 5/1997 | Thurston et al. | 463/38 |
| 6,004,134 A | 12/1999 | Marcus et al. | |
| 6,036,495 A | 3/2000 | Marcus et al. | |
| 6,429,849 B1 * | 8/2002 | An et al. | 345/161 |
| 6,482,010 B1 | 11/2002 | Marcus et al. | |
| 6,573,885 B1 * | 6/2003 | McVicar | 345/161 |
| 6,851,950 B1 * | 2/2005 | Gamnig | 434/45 |

* cited by examiner

*Primary Examiner* — Gene Kim
*Assistant Examiner* — Alyssa Hylinski
(74) *Attorney, Agent, or Firm* — Schmeiser, Olsen & Watts LLP

(57) ABSTRACT

A flight simulator yoke is provided having a single handle having a handgrip and yoke shaft operable from a left side of a user, wherein a neutral position for the handle is at a 45 degree angle. The yoke may further include two trim axes traverse to each other; and two moveable spring devices. The spring devices are operatively coupled to the trim axes, each spring device having a positive center detent, wherein the positive center detent requires a predetermined amount of force in order to move the yoke along each trim axis. The flight simulator yoke may simulate a yoke of a Cirrus aircraft.

20 Claims, 9 Drawing Sheets

FLIGHT SIMULATOR YOKE

CROSS REFERENCE TO RELATED APPLICATION

This application claims priority to U.S. Provisional Patent Application entitled "FLIGHT SIMULATOR YOKE," Ser. No. 61/028,674, filed Feb. 14, 2008, the disclosure of which is hereby incorporated entirely herein by reference.

BACKGROUND OF THE INVENTION

1. Technical Field

This invention relates generally to a flight simulator yoke and more particularly to a flight simulator yoke for a Cirrus SR20 aircraft.

2. State of the Art

There are several types of simulator yokes currently available that provide the ability to simulate the feel of a yoke a particular aircraft. This allows for interactive training of a pilot and allows them to learn particular aspects of flying without the need of actually flying an aircraft.

Other types of simulator yokes may be utilized for gaming purposes. For example, consumers may purchase a flight simulator yoke in order to play a particular flying video game or even for use with a home flight simulator that operates on a home electronic device, such as a personal computer. In these instances, the simulator yoke may be portable or small in size.

The use of conventional simulator yokes are becoming more popular, particular in instances where those training to be a pilot may utilize a particular number of hours spent in a simulator as actual flight time. These conventional flight simulator yokes however have their limitations.

Among other limitations and for exemplary purposes only, conventional flight simulators are limited in their ability to accurately simulate all types of aircraft yoke. Particularly, there is no conventional simulator yoke for simulating a Cirrus SR20 aircraft. Further, conventional simulator yokes are limited in their ability to simulate an electric trim that actuates a mechanical response of an aircraft within a portable unit. Further still, conventional simulator yokes do not provide for a positive spring detent in two axes.

Accordingly, there is a need in the field of flight simulator yokes for an improved flight simulator yoke to overcome the limitations of conventional simulator yokes.

DISCLOSURE OF THE INVENTION

The present invention relates to a single handed flight simulator yoke for placement on a left side of the pilot. The simulator yoke simulates the function and operation of a Cirrus SR20 yoke.

An aspect of the invention may include a flight simulator yoke comprising a single handle having a handgrip operable from a left side of a user, wherein a neutral position for the handgrip is at a 45 degree angel. The simulator yoke may further include an electric trim on two trim axes and a thumb switch operatively coupled to the handgrip to control the electric trim. The simulator yoke may be a moveable yoke by means of small motors operative coupled to worm drives, wherein the motors are activated in response to movement of the thumb switch. This mimics mechanisms in the aircraft which are large and complex, and would not fit into a desktop yoke.

The yoke may also include at least two spring devices corresponding to each trim axis. The simulator yoke may return to center on both axes with a positive detent, wherein the positive detent requires a predetermined amount of force in order to move the yoke along each axis. The electric trim may operate to move this center detent point by moving the entire spring device on either trim axis.

Aspects of the present invention may also include a translation mechanism to translate the rotational axis to linear motion. The translation mechanism may include a cam and roller mechanism.

Another aspect of the present invention may include a flight simulator having a flight simulator yoke, the simulator comprising a seat, a control panel, screens for displaying flight information and simulation, throttle controls, pedals and a flight simulator yoke. The yoke includes a single handle having a handgrip and yoke shaft operable from a left side of a user, wherein a neutral position for the handle is at a 45 degree angle; two trim axes traverse to each other; and two moveable spring devices operative coupled to the trim axes, each spring device having a positive center detent, wherein the positive center detent requires a predetermined amount of force in order to move the yoke along each trim axis.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a single handed flight simulator yoke for placement on a left side of the pilot. The simulator yoke simulates the function and operation of a Cirrus SR20 yoke.

Figure 1:
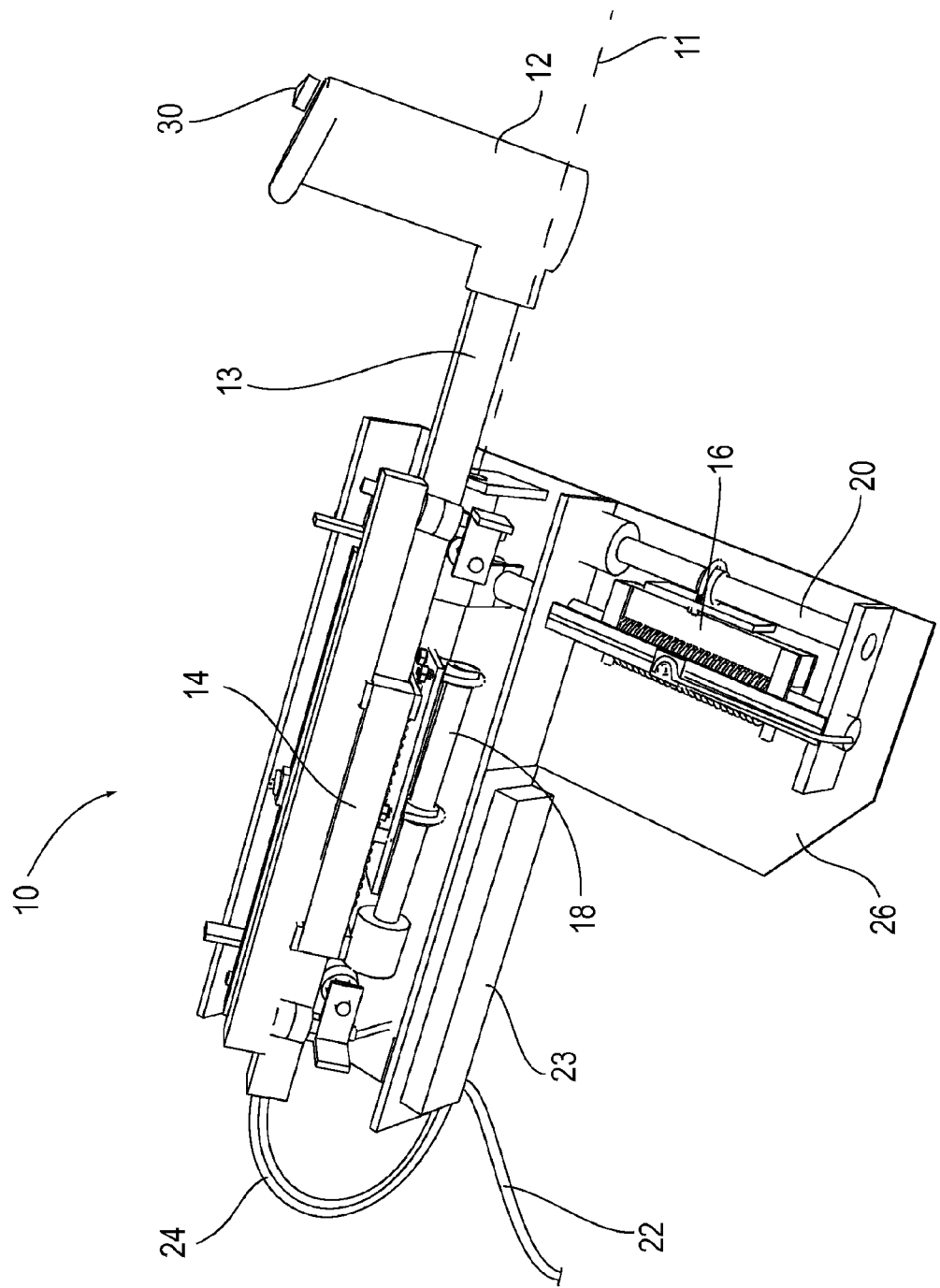
FIG. 1 is a perspective view of a flight simulator yoke in accordance with the present invention.

Referring to the drawings, FIG. 1 depicts a perspective view of a single handle flight simulator yoke 10 according to particular embodiments of the present invention. The simulator yoke 10 may include a handgrip 12, a yoke shaft 13, a first trim axis 18 and a second trim axis 20. The handgrip 12 is coupled to the yoke shaft 13 and allows the handgrip 12 and the yoke shaft 13 to move rotationally about a rotation axis 11, wherein the rotation axis 11 is a predetermined distance from an axis of the yoke shaft 13. The simulator yoke 10 may further include a first spring device 14 and a second spring device 16. Further still, the simulator yoke 10 may include a trim thumb switch 30 for controlling the electric trim as will be discussed in greater detail with respect to FIGS. 2A, 2B and 3.

The hand grip 12 simulates the hand grip of a Cirrus SR20 in all aspects including finger recesses as well as being positioned at approximately a forty-five degree angle. The hand grip 12 includes a thumb switch 30. The thumb switch 30 may be operatively coupled to each trim axis 18 and 20. As the thumb switch 30 may be moveable back and forth in at least two directions. The direction is associated with the each trim axis 18 and 20. The movement of the thumb switch activates the movement of the electric trim axes 18 and 20.

Figure 2A:
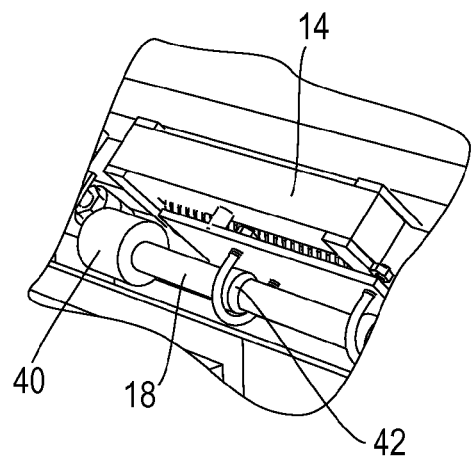
FIGS. 2A-2B are perspective views of a first spring device of a flight simulator yoke in accordance with the present invention.
Figure 2B:
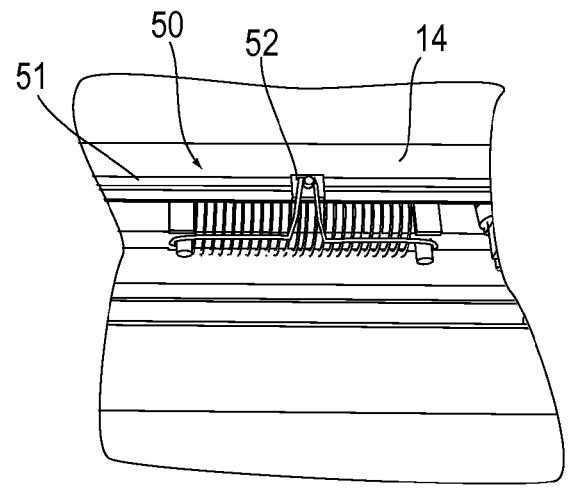

With additional reference to FIGS. 2A and 2B, the first electric trim axis 18 includes a motor 40 and a spring device coupler 42. The motor 40 may be a bi-directional motor that allows rotation in two directions. The first trim axis 18 may be a worm driven axis wherein the spring device coupler 42 travels linearly along the first trim axis 18 in response to the rotation of the trim axis 18 in each rotational direction. The spring device coupler 42 is coupled to the first spring device 14. Therefore, the translational movement of the spring device coupler 42 also moves the spring device linearly along the first trim axis 18 in response to the rotation of the first trim axis 18.

The first spring device 14 has a center position with a positive detent, wherein it requires a predetermined amount of force to manually move the hand grip 12 and the yoke shaft in a direction along the first trim axis 18. Movement of the spring device 14 along the first trim axis 18 moves the center of the first spring device 14 in response to the adjustment of the electric trim by use of the thumb switch 30. This accurately simulates the movement of the center detent of the Cirrus SR20 yoke, wherein the center moves in response to the trim adjustments.

Figure 3:
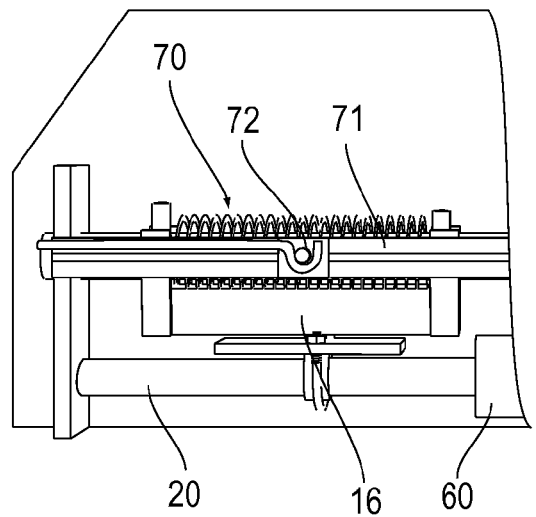
FIG. 3 is a top view of a second spring device of a flight simulator yoke, in accordance with the present invention.

Referring further to the drawings and particularly to FIG. 3, the second electric trim axis 20 includes a motor 60 and a spring device coupler (not shown). The motor 60 may be a bi-directional motor that allows rotation in two directions. The second trim axis 20 may be a worm driven axis wherein the spring device coupler travels linearly along the second trim axis 20 in response to the rotation of the trim axis 20 in each rotational direction. The spring device coupler is coupled to the second spring device 16. Therefore, the translational movement of the spring device coupler also moves the spring device linearly along the second trim axis 20 in response to the rotation of the second trim axis 20.

The second spring device 16 has a center position with a positive detent, wherein it requires a predetermined amount of force to manually move the hand grip 12 and the yoke shaft in a direction along the second trim axis 20. Movement of the spring device 16 along the second trim axis 20 moves the center of the second spring device 16 in response to the adjustment of the electric trim by use of the thumb switch 30. This accurately simulates the movement of the center of the Cirrus SR20 yoke, wherein the center moves in response to the trim adjustments.

The simulator yoke 10 may further include a second resistor 70 coupled adjacent the second spring device 16. The second resistor 70 includes a stationary portion 71 held in a position adjacent the second spring device 16 and substantially parallel to the second trim axis 20. The second resistor further includes a moveable portion 72 that is operative coupled to the second spring device 16, wherein the moveable portion 72 moves in response to movement of the second spring device 16. The second resistor 70 may be utilized to communicate the position of the second spring device 16 and the center of the second spring device 16 in order to accurately communicate that position to a computer for use in a simulated flight.

Figure 4A:
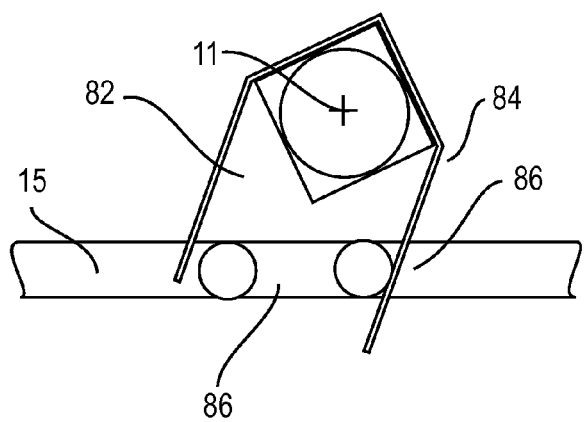
FIGS. 4A-4C are end views of a translation mechanism of a flight simulator yoke in accordance with the present invention.
Figure 4B:
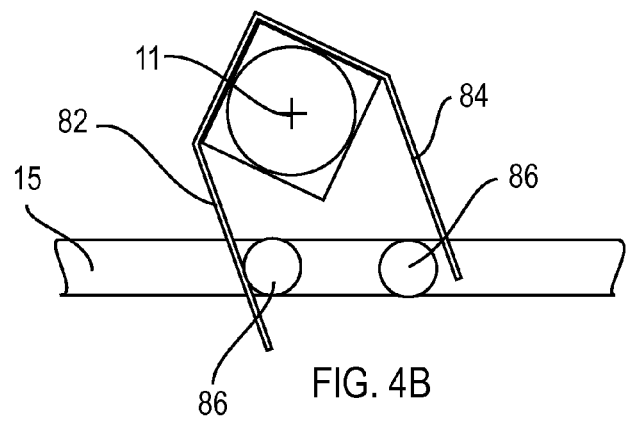
Figure 4C:
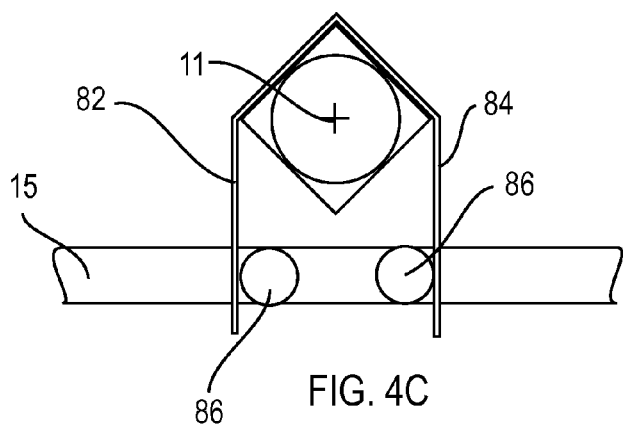

Referring further to the drawings, FIG. 4 depicts a translation mechanism 80 of a flight simulator yoke in accordance with the embodiments of the present invention. The translation mechanism 80 allows for the rotational movement of the handgrip 12 and the yoke shaft 13 about the rotation axis 11, wherein the rotation axis 11 is a predetermined distance from an axis of the yoke shaft 13. In order for the rotational movement of the handgrip 12 and the yoke shaft 13 to simulate the rotational movement of a Cirrus SR20 yoke, there needed to be a translation of the rotational movement of the handgrip 12 and yoke shaft 13 into a linear movement along the direction of the second trim axis 20. Accordingly, the translation mechanism 80 provides this translational movement. The translation mechanism 80 may include a bracket having opposing cantilevered sides 82 and 84. The sides 82 and 84 may be preloaded with a predetermined amount of force in order to maintain the proper operation of the translation mechanism 80. The translation device may further include a plurality of bearings or rollers 86 coupled on opposing sides of a translation shaft 15. The translation shaft 15 operatively engages the second spring device 16, wherein the second spring device 16 provides a center detent that requires a predetermined force in order to rotate the handgrip 12 and the yoke shaft 13.

In operation, one of the sides 82 and 84 of the translation mechanism 80 engages a portion of the bearings or rollers 86 and moves the bearings in a linear direction substantially similar to the direction of the second trim axis 20. The translation shaft 15 move linearly in a simultaneous response to the movement of the bearings 86. The side 82 or 84 that engages the bearings 86 is dependent upon the direction of rotation of the handgrip 12.

Figure 5A:
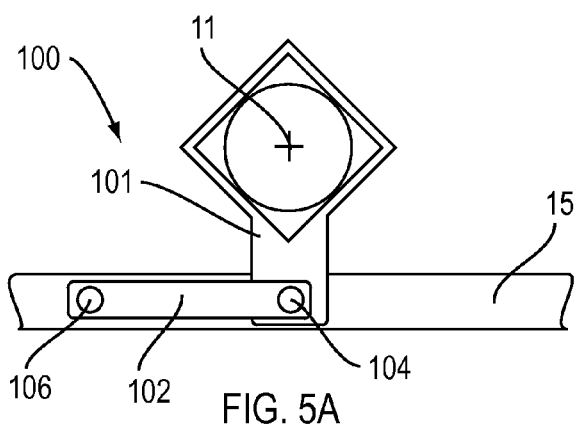
FIGS. 5A-5C are end views of an alternate embodiment of a translation mechanism of a flight simulator yoke.
Figure 5B:
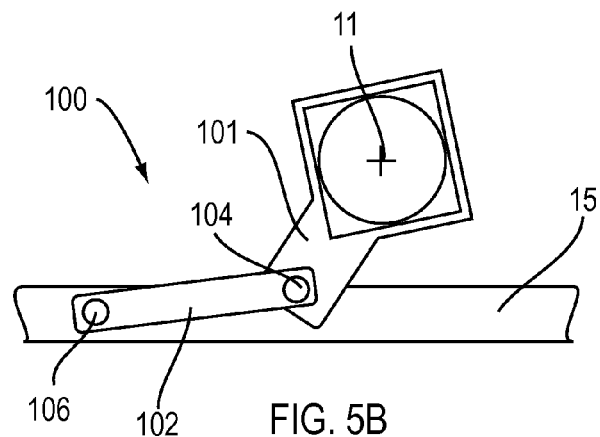
Figure 5C:
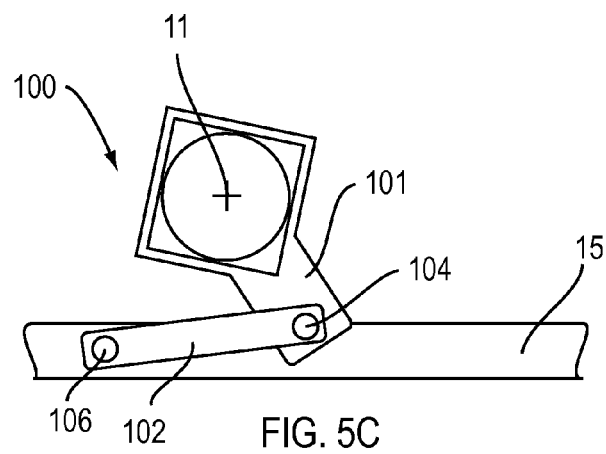

Referring further to the drawings; FIG. 5 depicts an alternate embodiment of a translation mechanism 100. The translation mechanism 100 may include a bracket 101 coupled to the member having rotation axis 11, wherein rotation of the handgrip 12 results in rotation of the bracket 101. The translation mechanism 100 may further include a translation bar 102 coupled between a pivot point 104 coupled to the bracket 101 and pivot point 106 coupled to the translation shaft 15. As the bracket 101 is rotated, the translation bar 102 moves the translation shaft 15 from side to side in response to the rotation of the bracket 101. Other features of the translation mechanism 100 and the flight simulator yoke 10 are the same as previously described.

Figure 6A:
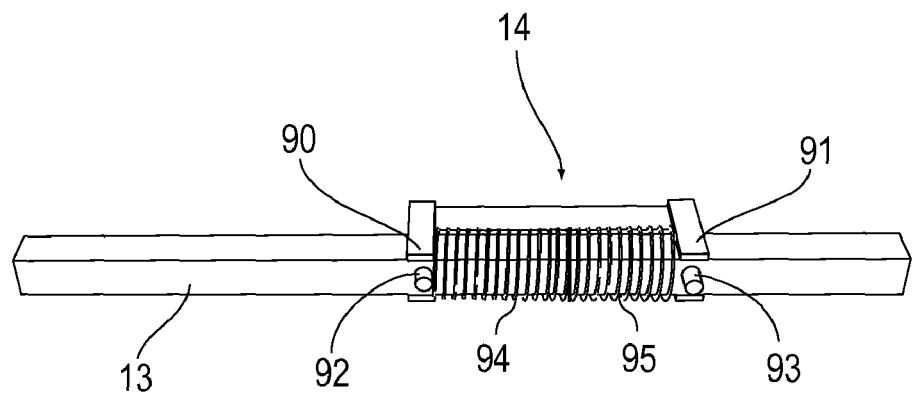
FIGS. 6A-6C are perspective view of a spring device of a flight simulator yoke.

FIG. 6 depicts various views of a spring device 14 in accordance with embodiments of the present invention. The spring device 14 may include a first bracket 90 and a second bracket 91. The spring device 14 may also include a first pin 92 and a second pin 93. Further still the spring device 14 may include a first spring 94 and a second spring 96. The first and second springs 94 and 96 are coupled about shaft 13 adjacent each other and in contact with each other when the shaft 13 is in a neutral position, as shown in FIG. 6A. The brackets 90 and 91 are maintained stationary within the flight simulator yoke 10. The pins are coupled to the shaft 13, and move in response to movement of the shaft 13. The first pin 92 is coupled adjacent the first bracket 90, wherein the first pin 92 and the first bracket 90 each engage an end of the first spring 94, when the shaft 13 is in a neutral position. The second pin 93 is coupled adjacent the second bracket 91, wherein the second pin 93 and the second bracket 91 each engage an end of the second spring 95, when the shaft 13 is in a neutral position.

Figure 6B:
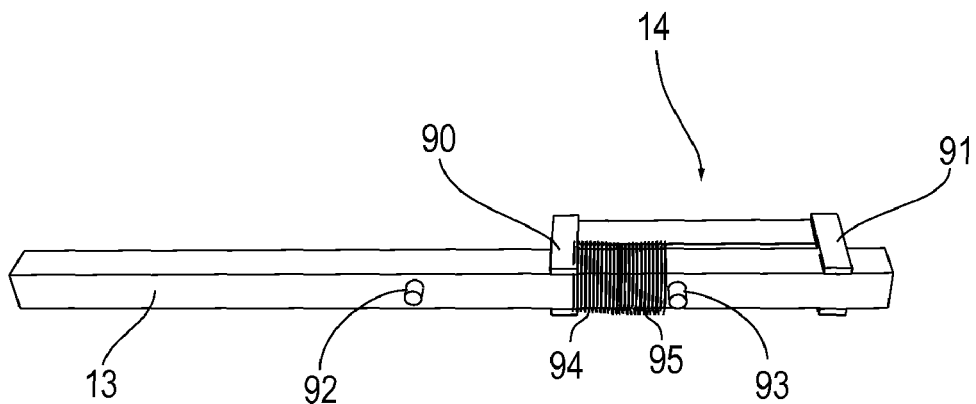
Figure 6C:
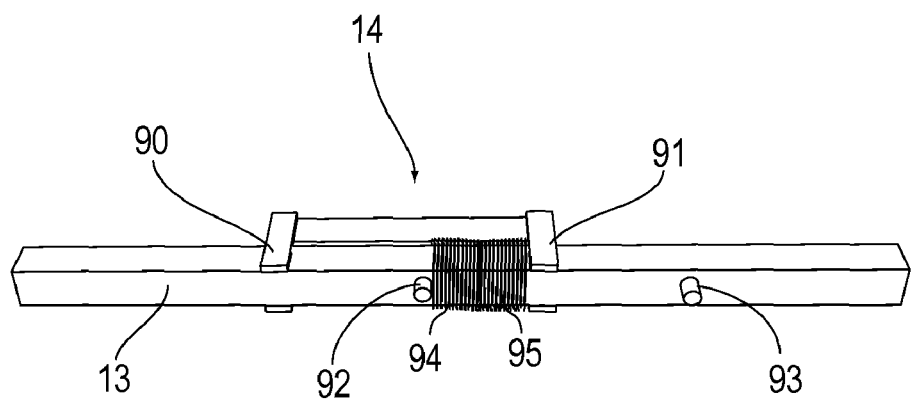

As the shaft 13 is moved in a first direction, as shown in FIG. 6B, the second pin 93 engages the second spring 95 and the first bracket 90 engages the first spring 94 such that the first and second springs 94 and 95 compress until they are fully compressed. As the shaft 13 is moved back into neutral position the springs 94 and 95 are expanded again. The shaft 13 may also be moved in a second direction shown in FIG. 6C. The first pin 92 engages the first spring 94 and the second bracket 91 engages the second spring 95 such that the first and second springs 94 and 95 compress until they are fully compressed. As the shaft 13 is moved back into neutral position the springs 94 and 95 are expanded again. It will be understood that the spring device 16 operates in substantially the same manner as the spring device 14.

Referring again to FIG. 1, the simulator yoke 10 may also include a power source 22, an electrical wire harness and a plurality of wires 24. The power source 22 provides power to the simulator yoke 10 and allows all electric and electronic components to function and operate. The wire harness 23 allows for a central location of connecting wires together and the wire 24 allow for the transmission of particular signals in order to operate the electric and electronic aspects of the simulator yoke, such as, but not limited to movement of the electric trim, the sending and receiving of information via a USB connection to a computer or simulator of information with regard to the position of the simulator yoke 10 and the associated manual movements of the yoke. The power source 22, wire harness 23 and wires 24 essentially allow for the ability of the simulator yoke to operate as well as allow the simulator yoke 10 to communicate with a computer as part of a simulation flight.

Additionally, the simulator yoke 10 may include a base 26. The base 26 may be used to support all of the components of the simulator yoke 10 and may further be used to rest upon a surface during use. According to other embodiments, the base 26 may be secured to a surface within a flight simulator or on a desk by a home computer. The base allows for the yoke 10 to be portable and moved from surface to surface.

Figure 7:
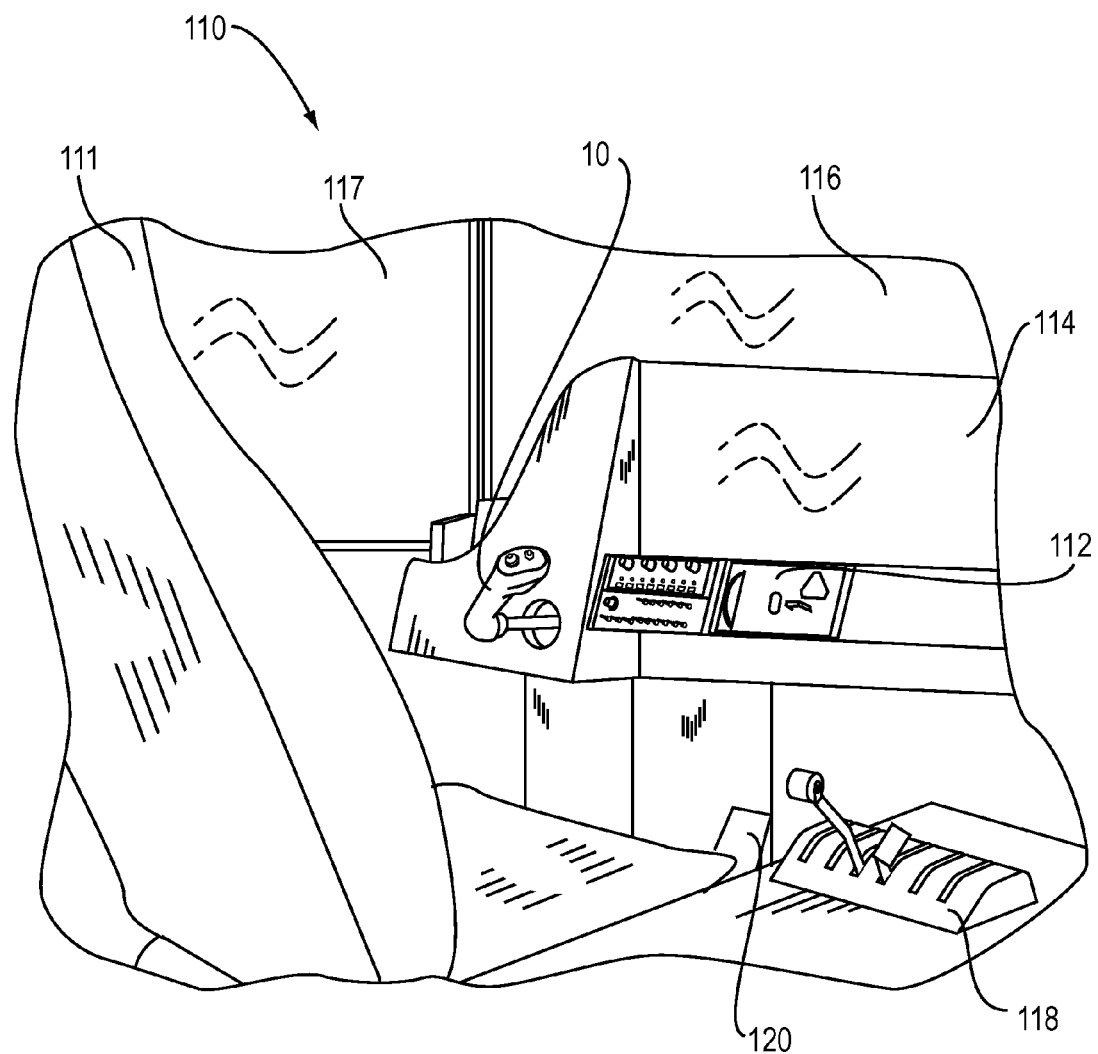
FIG. 7 is a perspective view of a flight simulator having a flight simulator yoke in accordance with the present invention.

Referring again to the drawings, FIG. 7 depicts a flight simulator 110 in accordance with the present invention. The flight simulator 110 may include features typical of a flight simulator, such as, but not limited to a seat 111, instrument panel 112, instrument screen 114, flight screens 116 and 117, throttle controls 118 and pedals 120. The flight simulator may also include a flight simulator yoke 10 in accordance with the present invention. It will be understood that the flight simulator yoke 10 enables the flight simulator to mimic and simulate a Cirrus aircraft.

Referring further to FIGS. 8A-8D, other embodiments of the present invention may include a flight simulator that requires a dual handle flight simulator yoke 130 with a first and second handle 132 and 134 in order to further simulate a Cirrus aircraft. Each handle 132 and 134 has a handgrip 136 and 138. The first handle 132 is operable from a left side of a first user and the second handle 134 operable from the right side of a second user, wherein a neutral position for each the first and second handle 132 and 134 is at a 45 degree angle. The dual handle yoke 130 may include one yoke 10 that may be similar to the yoke previously discussed in the application, where like numbers refer to like components. Referring additionally to FIGS. 1-4, the yoke 10 may include a first trim axis 18 operatively coupled to a yoke shaft 13 in a linear relationship, the first trim axis 18 may be transverse to a second trim axis 20 operatively coupled to the yoke shaft 13 in a translated rotational relationship. Each trim axis 18 and 20 having a liner potentiometer to measure movement along the trim axis.

The yoke 10 may include first and second moveable spring devices 14 and 16 operatively coupled to the trim axes 18 and 20 respectively, such that movement is measured by potentiometers 50 and 70 in response to the respective movement of the first and second spring devices 14 and 16, each spring device having a positive center detent, wherein the positive center detent requires a predetermined amount of force in order to move the yoke shaft 13 along each trim axis 18 and 20.

Figure 8A:
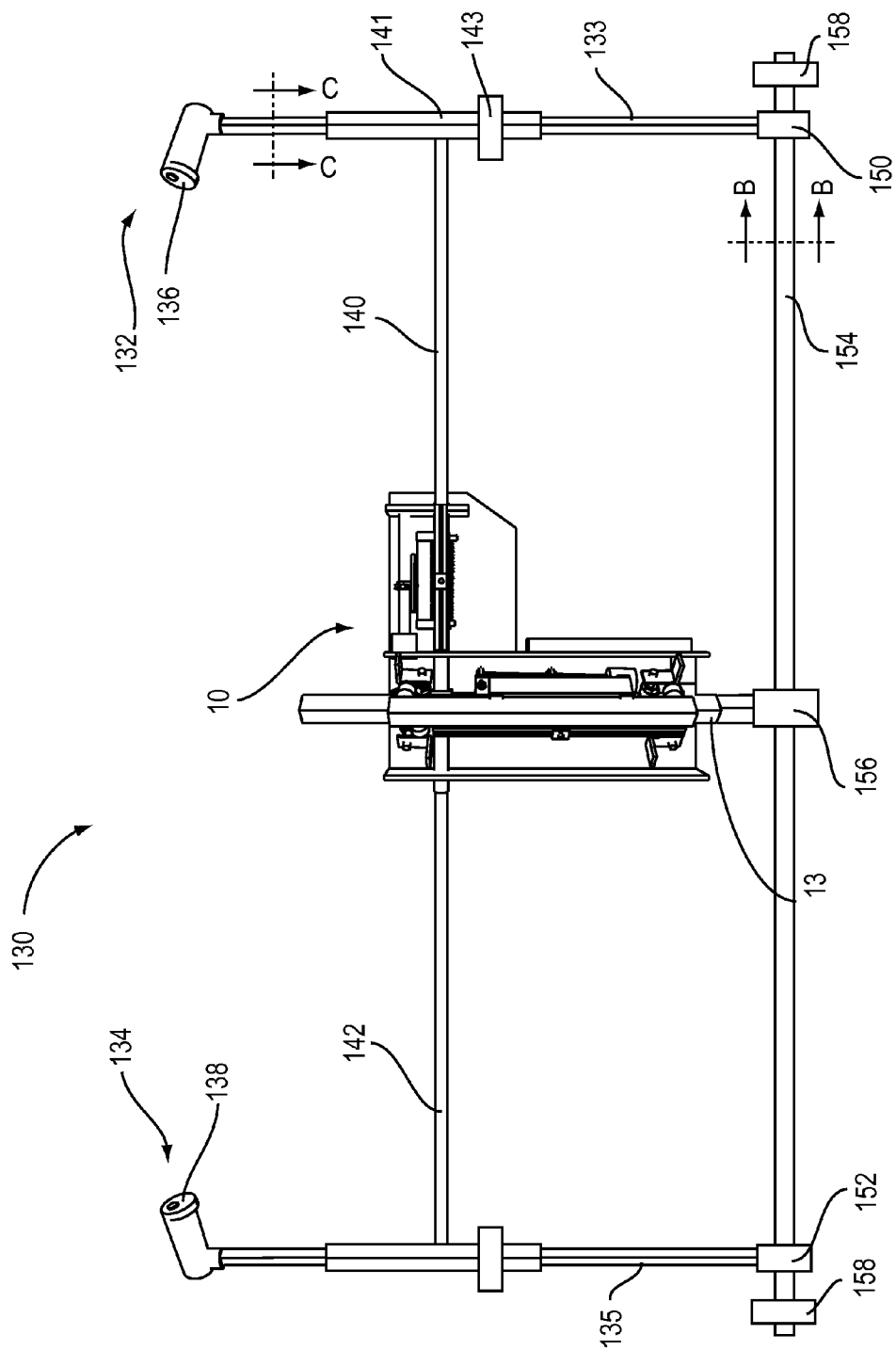
FIG. 8A is a top view of a dual handle flight simulator yoke.
Figure 8B:
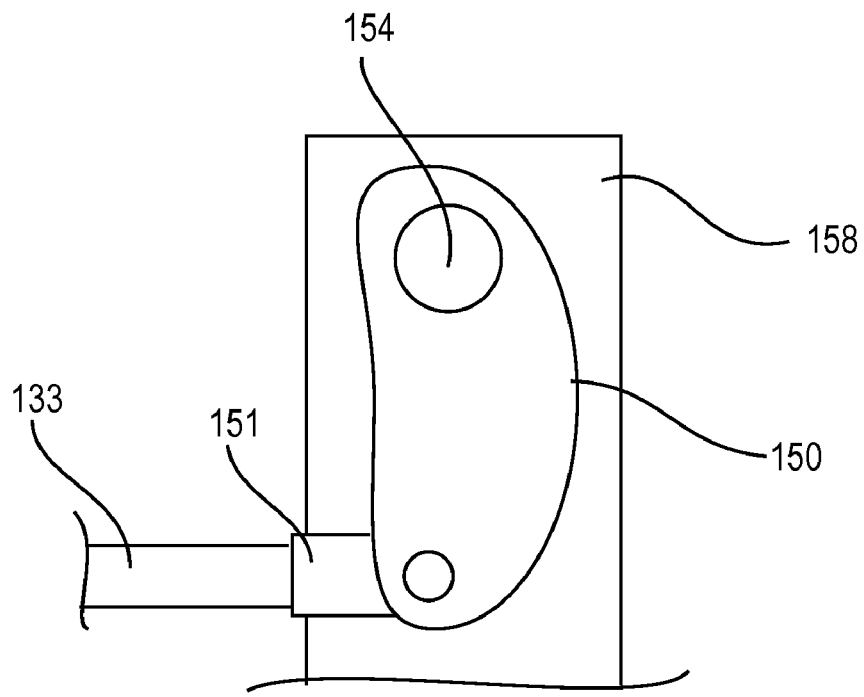
FIG. 8B is a section view of a dual handle flight simulator yoke taken along line B-B of FIG. 8A.
Figure 8C:
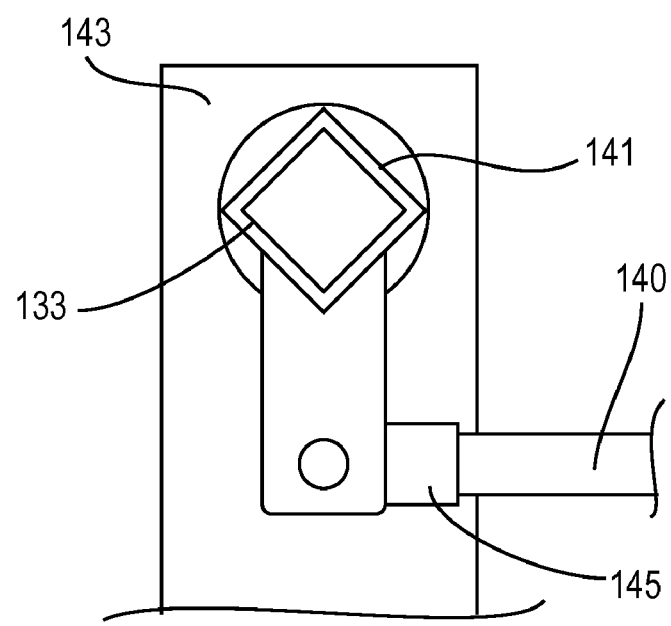
FIG. 8C is a section view of a dual handle flight simulator yoke taken along line C-C of FIG. 8A.

The dual handle yoke 130 may include rotational linking members 140 and 142 operatively coupled between a translation shaft 15 of the yoke 10 and rotatable sleeves 141, wherein the rotation of one of the first and second handle 132 and 134 results in the rotation of one of the sleeves 141, thereby moving one of the rotational linking members 140 and 142 linearly. Referring to FIG. 8C, the sleeve 141 may be held in a position by support member 143 allowing only rotational movement of the sleeve 141. The rotational linking members 140 and 142 may be coupled to the sleeve 141 by ball joint 145, thereby allowing the rotational movement of the sleeve 141 to translate into linear movement of the rotational linking members 140 and 142. The linear movement of one of the rotational linking members 140 and 142 results in linear movement of the translation shaft 15. The linear movement of translation shaft will result in linear movement of one of the rotational linking members 140 and 142 of the handle 132 and 134 that was not rotated. The other handle 132 and 134 will then rotate by the same angular distance and linear movement of the translation shaft.

The dual handle yoke 130 may include linear linking members operatively coupled to the yoke shaft 13 of the yoke 10, wherein the linear movement of the one of the first and second handle 132 and 134 results in the linear movement of the other handle and the yoke shaft 13 a same distance in the same direction. The yoke shaft 13 may be coupled to the linear linking members in an offset configuration to accommodate rotation of the yoke shaft 13 about rotational axis 11. In one embodiment, as shown in FIG. 8A, the linear linking members may include cams 150 and 152 respectively coupled between the first and second handle shafts 133 and 135 and a shaft 154. Another cam 156 may be coupled between the shaft 154 and the yoke shaft 13. Referring to FIG. 8B, a section view of a dual handle flight simulator yoke 130 depicts a linear linking member 150. The other linear linking members 152 and 156 are similar. The shaft 154 may be held in a position by support members 158, allowing only rotation of the shaft 154. The linear linking member 150 may be coupled to the shaft 154, such that the shaft rotates in response to rotation of the linear linking member 150. The first handle shaft 133 may be coupled to the linear linking member 150 by a ball joint 151. The ball joint 151 allows the linear linking member 150 to rotate in response to linear movement of the first handle shaft 150. The other linear linking members 152 and 156 rotate in response to rotation of the shaft 154, thereby allowing the yoke 13 and the second handle shaft 135 to move substantially the same linear distance in the same direction as the movement of the first handle shaft 133.

Figure 8D:
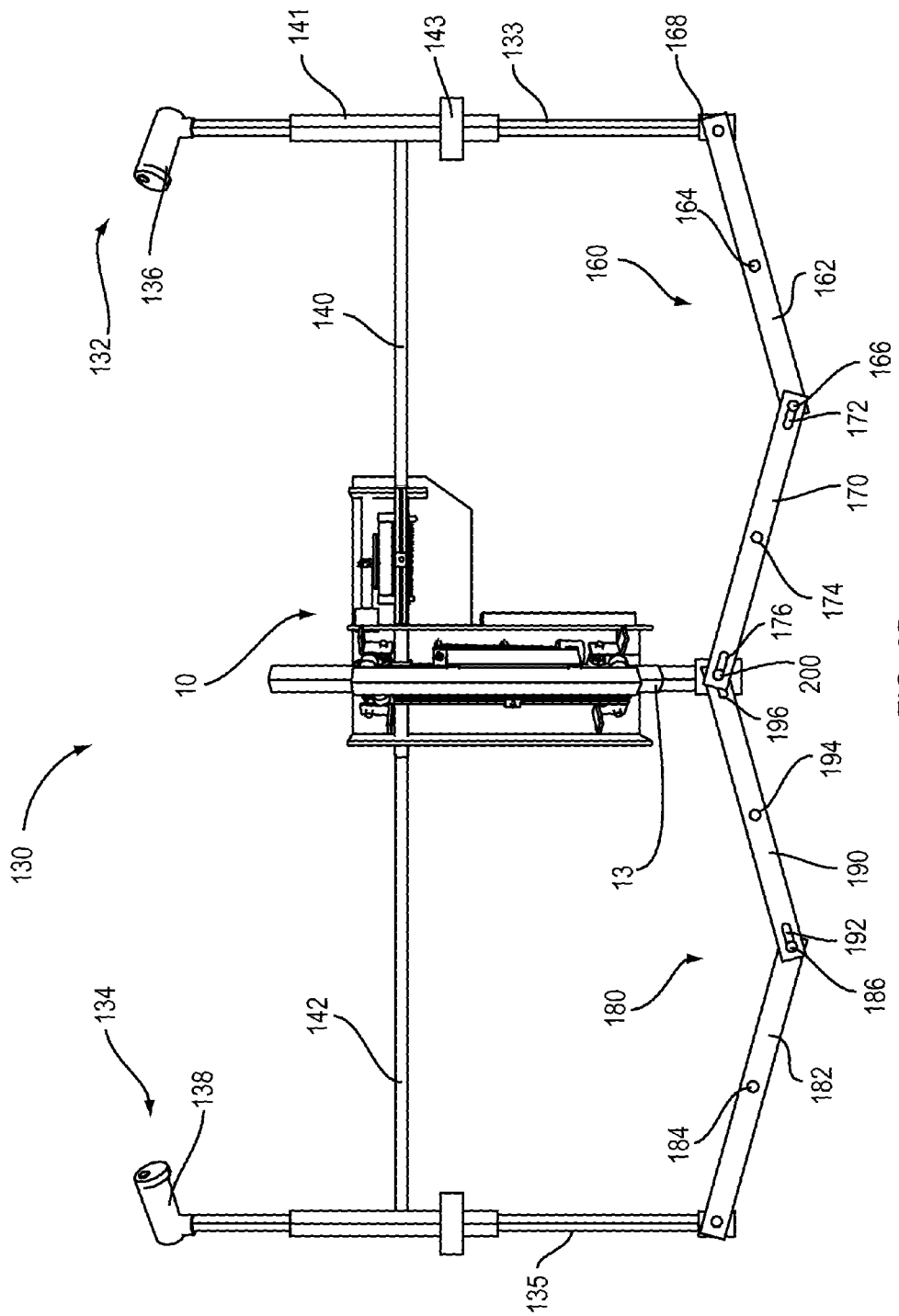
FIG. 8D is a top view of another embodiment of a flight simulator yoke with two handles.

In another embodiment as shown in FIG. 8D, the linear linking members may include a first linking mechanism 160 and a second linking mechanism 180. The first linking mechanism 160 may include a first linking member 162 pivotally coupled on one end to an end of the shaft of the first handle 132. The first linking member 162 may be coupled to a second linking member 170 by a pin 166 coupled to a slot 172 of the second linking member 170. The first linking member 162 has a pivot point 164, wherein the first linking member 162 is rotatable about the pivot point 164. The second linking member 170 has a pivot point 174, wherein the second linking member 170 is rotatable about the pivot point 174. The pin 166 and slot 172 configuration allow for the linking members to rotate in opposite directions without binding. The second linking member 170 may include a second slot 176 coupled to a pin 200. The pin 200 is coupled to the yoke shaft 13. This allows the rotation of the second linking member 170 to translate into linear movement of the yoke shaft 13.

The second linking mechanism 180 may include a first linking member 182 pivotally coupled on one end to an end of the shaft of the second handle 134. The first linking member 182 may be coupled to a second linking member 190 by a pin 186 coupled to a slot 192 of the second linking member 180. The first linking member 182 has a pivot point 184, wherein the first linking member 182 is rotatable about the pivot point 184. The second linking member 190 has a pivot point 194, wherein the second linking member 190 is rotatable about the pivot point 194. The pin 186 and slot 192 configuration allow for the linking members to rotate in opposite directions without binding. The second linking member 190 may include a second slot 196 coupled to a pin 200. The pin 200 is coupled to the yoke shaft 13. This allows the rotation of the second linking member 190 to translate into linear movement of the yoke shaft 13.

This configuration of first and second linking mechanisms 160 and 180 allows the linear movements of one handle to translate into linear movements of the yoke shaft and the other handle.

The rotational linking members 140 and 142 are operatively coupled to one of the second spring device 16, wherein movement of one of the first and second handle 132 and 134 rotationally results in movement of the first spring device 16.

The linear linking members are operatively coupled to the first spring device 14, wherein movement of one of the first and second handle 132 and 134 linearly results in movement of the first spring device 14.

The yoke 10 of the dual handle yoke 130 may further include an electric trim having two bi-directional motors adapted to trim the yoke without manual input on one of the first and second handles. Each of the first and second handles 132 and 134 may comprise a thumb switch operatively coupled to the handgrip wherein the two bi-directional motors operate in response to movement of the thumb switch. The two bi-directional motors are mechanically coupled to worm gears that are parallel to the two trim axes, wherein the worm gears move in response to operation of the two motors.

It will be understood that this configuration of a dual handle yoke 130 results in one handle moving simultaneously when the other handle is moved. The movements will be substantially identical in direction and distance. This movement includes movement due to electronic trim adjustments.

Accordingly, the components defining any flight simulator yoke implementation may be formed of any of many different types of materials or combinations thereof that can readily be formed into shaped objects provided that the components selected are consistent with the intended operation of a flight simulator yoke implementation. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any flight simulator yoke implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A flight simulator yoke comprising:
   a single handle having a handgrip and yoke shaft operable from a left side of a user, wherein a neutral position for the handle is at a 45 degree angle;
   an electric trim on two trim axes traverse to each other, each trim axis having a linear potentiometer to measure movement along the trim axis and a motor;
   two moveable spring devices operatively coupled to the trim axes such that movement is measure by the potentiometers in response to movement of the spring devices, each spring device having a positive center detent, wherein the positive center detent requires a predetermined amount of force in order to move the yoke along each trim axis; and
   a thumb switch operatively coupled to the handgrip wherein the two motors operate in response to movement of the thumb switch.

2. The flight simulator yoke of claim 1, wherein the electric trim is adapted to trim the yoke without manual input on the handle.

3. The flight simulator yoke of claim 2, wherein the two motors are bi-directional motors.

4. The flight simulator yoke of claim 3, wherein the two bi-directional motors are mechanically coupled to worm gears that are parallel to the two trim axes, wherein the worm gears move in response to operation of the two motors.

5. The flight simulator yoke of claim 4, wherein each spring device moves along a worm gear corresponding to a trim axis in response to operation of the corresponding bi-directional motor, each direction of movement of the spring device corresponding to a direction of rotation of the corresponding bi-directional motor.

6. The flight simulator yoke of claim 5, wherein the positive center detent of each spring device moves along the corresponding trim axis in response to movement of each spring device.

7. The flight simulator yoke of claim 1, further comprising a translation mechanism to translate rotational movement of the handle to linear motion of a translation shaft.

8. The flight simulator yoke of claim 1, wherein each of the spring devices comprises a first bracket; a second bracket; a first pin; a second pin; a first spring and a second spring, the first and second springs are coupled about one of the yoke shaft and a translation shaft, the first and second springs are adjacent each other and in contact with each other when the yoke shaft or translation shaft is in a neutral position.

9. The flight simulator yoke of claim 8, wherein the first and second brackets are maintained stationary within the flight simulator yoke.

10. The flight simulator of claim 9, wherein the first and second pins are coupled to one of the yoke shaft and the translation shaft, and move in response to movement of the yoke shaft or translation shaft.

11. The flight simulator of claim 10, wherein the first pin is coupled adjacent the first bracket and the second pin is coupled adjacent the second bracket, wherein the first pin and the first bracket each engage an end of the first spring and the second pin and second bracket each engage an end of the second spring when the yoke shaft or translation shaft is in the neutral position.

12. The flight simulator of claim 11, wherein the second pin engages the second spring and the first bracket engages the first spring such that the first and second springs compress in response to movement of the yoke shaft or translation shaft in a first direction.

13. The flight simulator of claim 11, wherein the first pin engages the first spring and the second bracket engages the second spring such that the first and second springs compress in response to movement of the yoke shaft or translation shaft in a second direction.

14. A dual handle flight simulator yoke comprising:
a first and second handle, each having a handgrip; the first handle operable from a left side of a first user and the second handle operable from the right side of a second user, wherein a neutral position for each the first and second handle is at a 45 degree angle;
a first trim axis operatively coupled to a yoke shaft of the yoke in a linear relationship, the first trim axis transverse to a second trim axis operatively coupled to the yoke shaft in a translated rotational relationship an electric operatively, each trim axis having a linear potentiometer to measure movement along the trim axis and a motor;
a first and second moveable spring device operative coupled to the first and second trim axes such that movement is measured by the potentiometers in response to movement of the first and second spring devices, each spring device having a positive center detent, wherein the positive center detent requires a predetermined amount of force in order to move the yoke shaft along each trim axis;
rotational linking members operatively coupled to a translation shaft of the yoke, wherein the rotation of one of the first and second handle results in the rotation of the other handle by the same angular distance and linear movement of the translation shaft;
linear linking members operatively coupled to the yoke shaft wherein the linear movement of one of the first and second handle results in the linear movement of the other handle and the yoke shaft a same distance in the same direction; and
a thumb switch operatively coupled to each handgrip wherein the two motors operate in response to movement of the thumb switch.

15. The flight simulator yoke of claim 14, wherein the rotational linking members are operatively coupled the second spring device, wherein movement of one of the first and second handle rotationally results in movement of the second spring device.

16. The flight simulator yoke of claim 14, wherein the linear linking members are operatively coupled to the first spring device, wherein movement of one of the first and second handle linearly results in movement of the first spring device.

17. The flight simulator yoke of claim 14, wherein the electric trim is adapted to trim the yoke without manual input on the handle.

18. The flight simulator yoke of claim 17, wherein the two motors are bi-directional motors.

19. The flight simulator yoke of claim 18, wherein the two bi-directional motors are mechanically coupled to worm gears that are parallel to the two trim axes, wherein the worm gears move in response to operation of the two motors.

20. A flight simulator having a flight simulator yoke, the simulator comprising:
a seat;
a control panel;
screens for displaying flight information and simulation;
throttle controls;
pedals; and
a flight simulator yoke comprising:
a single handle having a handgrip and yoke shaft operable from a left side of a user, wherein a neutral position for the handle is at a 45 degree angle;
an electric trim on two trim axes traverse to each other, each trim axis having a linear potentiometer to measure movement along the trim axis and a motor;
two moveable spring devices operatively coupled to the trim axes such that movement is measure by the potentiometers in response to movement of the spring devices, each spring device having a positive center detent, wherein the positive center detent requires a predetermined amount of force in order to move the yoke along each trim axis; and
a thumb switch operatively coupled to the handgrip wherein the two motors operate in response to movement of the thumb switch.

* * * * *